(12) United States Patent
Lin et al.

(10) Patent No.: US 10,175,730 B2
(45) Date of Patent: Jan. 8, 2019

(54) HINGE MODULE AND ELECTRONIC DEVICE

(71) Applicants: Che-Hsien Lin, Taipei (TW); Ming-Chung Liu, Taipei (TW); Tung-Ying Wu, Taipei (TW); Yu-Ning Chang, Taipei (TW); Che-Hsien Chu, Taipei (TW)

(72) Inventors: Che-Hsien Lin, Taipei (TW); Ming-Chung Liu, Taipei (TW); Tung-Ying Wu, Taipei (TW); Yu-Ning Chang, Taipei (TW); Che-Hsien Chu, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 0 days.

(21) Appl. No.: 15/652,254

(22) Filed: Jul. 18, 2017

(65) Prior Publication Data
US 2018/0164856 A1 Jun. 14, 2018

Related U.S. Application Data

(60) Provisional application No. 62/433,750, filed on Dec. 13, 2016.

(51) Int. Cl.
*G06F 1/16* (2006.01)
*E05D 5/08* (2006.01)
(Continued)

(52) U.S. Cl.
CPC .............. *G06F 1/1681* (2013.01); *E05D 3/02* (2013.01); *E05D 3/04* (2013.01); *E05D 5/08* (2013.01);
(Continued)

(58) Field of Classification Search
CPC ......... G06F 1/1681; E05D 5/08; E05D 11/08; E05D 3/02
See application file for complete search history.

(56) References Cited

U.S. PATENT DOCUMENTS 9,540,856 B2 * 1/2017 Lin ...................... G06F 1/1681
9,541,963 B2 * 1/2017 Lin ...................... G06F 1/1681
(Continued)

FOREIGN PATENT DOCUMENTS

TW M513913 12/2015
TW M531732 11/2016

OTHER PUBLICATIONS

"Office Action of Taiwan Counterpart Application," dated Sep. 26, 2017, p. 1-p. 5.

*Primary Examiner* — Hoa C Nguyen
*Assistant Examiner* — Keith DePew
(74) *Attorney, Agent, or Firm* — JCIPRNET

(57) ABSTRACT

A hinge module including a fixing member, a moving assembly, and a torque member is provided. The moving assembly includes a bracket and an axis body protruding from the bracket. The torque member includes a first end portion and a second end portion opposite to each other. The first end portion is fixed to the fixing member. The second end portion includes a lunular shape axle sleeve with an opening. The lunular shape axle sleeve is rotatably sleeved around the axis body for providing friction so as to form torques while the axis body is rotated relative to the lunular shape axle sleeve. The lunular shape axle sleeve has a gradual changed thickness. An electronic device having the hinge module is further provided.

8 Claims, 7 Drawing Sheets

(51) Int. Cl.
*E05D 11/08* (2006.01)
*E05D 3/02* (2006.01)
*E05D 3/04* (2006.01)
*F16C 11/04* (2006.01)

(52) U.S. Cl.
CPC ............ *E05D 11/08* (2013.01); *E05D 11/082* (2013.01); *F16C 11/04* (2013.01); *G06F 1/16* (2013.01); *G06F 1/1616* (2013.01); *E05Y 2900/606* (2013.01)

(56) References Cited

U.S. PATENT DOCUMENTS

| | | | | |
|---|---|---|---|---|
| 9,759,242 | B2* | 9/2017 | Hsu | F16B 1/00 |
| 2009/0070962 | A1* | 3/2009 | Su | E05D 3/02 |
| | | | | 16/360 |
| 2010/0139040 | A1* | 6/2010 | Shen | G06F 1/1616 |
| | | | | 16/250 |
| 2016/0222707 | A1* | 8/2016 | Chuang | G06F 1/1681 |
| 2017/0208703 | A1* | 7/2017 | Lin | E05F 1/1016 |
| 2017/0344067 | A1* | 11/2017 | Lan | E05D 3/18 |

* cited by examiner

HINGE MODULE AND ELECTRONIC DEVICE

CROSS-REFERENCE TO RELATED APPLICATION

This application claims the priority benefit of U.S. provisional application Ser. No. 62/433,750, filed on Dec. 13, 2016. The entirety of the above-mentioned patent application is hereby incorporated by reference herein and made a part of this specification.

BACKGROUND OF THE INVENTION

1. Field of the Invention

The invention relates to a hinge module and an electronic device. More particularly, the invention relates to a hinge module with favorable torque efficiency and an electronic device with the hinge module.

2. Description of Related Art

Currently, a notebook computer is constituted by two bodies pivoted to each other. A user may close the two bodies of the notebook computer for easy portability. When the user intends to use the notebook computer, the user flips open the machine body with a display screen relative to the other one with a keyboard to use the notebook computer and watch the display screen. Specifically, the machine body with the display screen is pivoted to the machine body with the keyboard through hinge modules, such that the machine body with the display screen may pivot relative to the machine body with the keyboard through the hinge modules to adjust angles. Nevertheless, if the user flips open or closes the bodies frequently, the hinge modules may be deteriorated. Therefore, how to prolong durability of the hinge modules to enhance torque efficiency of the hinge modules has become an important issue in the industry.

SUMMARY OF THE INVENTION

The invention provides a hinge module for providing favorable torque efficiency.

The invention further provides an electronic device with the hinge module.

In an embodiment of the invention, a hinge module includes a fixing member, a moving assembly, and a torque member. The moving assembly includes a bracket and an axis body protruding from the bracket. The torque member includes a first end portion and a second end portion opposite to each other. The first end portion is fixed to the fixing member. The second end portion includes a lunular shape axle sleeve with an opening. The lunular shape axle sleeve is rotatably sleeved around the axis body for providing friction so as to form torques while the axis body is rotated relative to the lunular shape axle sleeve. The lunular shape axle sleeve has a gradual changed thickness.

In an embodiment of the invention, an electronic device includes a first machine body, a second machine body, and a hinge module. The hinge module includes a fixing member, a moving assembly, and a torque member. The fixing member is fixed to the second machine body. The moving assembly includes a bracket and an axis body protruding from the bracket. The bracket is fixed to the first machine body. The torque member includes a first end portion and a second end portion opposite to each other. The first end portion is fixed to the fixing member. The second end portion includes a lunular shape axle sleeve with an opening. The lunular shape axle sleeve is rotatably sleeved around the axis body for providing friction so as to form torques while the axis body is rotated relative to the lunular shape axle sleeve. The lunular shape axle sleeve has a gradual changed thickness.

In an embodiment of the invention, a thickness $T1$ of a portion of the lunular shape axle sleeve away from the opening is greater than a thickness $T2$ of a portion of the lunular shape axle sleeve away from the first end portion and close to the opening.

In an embodiment of the invention, a value of a ratio of the thickness $T1$ of the portion of the lunular shape axle sleeve away from the opening to the thickness $T2$ of the portion of the lunular shape axle sleeve away from the first end portion and close to the opening ($T1/T2$) falls in a range between 1.2 and 3.

In an embodiment of the invention, a position of a central point surrounded and defined by an inner surface of the lunular shape axle sleeve is different from a position of a central point surrounded and defined by an outer surface of the lunular shape axle sleeve.

In an embodiment of the invention, the bracket includes a flat portion, an arc shape portion extending from the flat portion, and a through hole portion located at an inner side of the arc shape portion. The plat portion is fixed to the first machine body. The hinge module further includes an arc shape outer cover. The arc shape portion of the bracket is fixed to an inner side of the arc shape outer cover. The axis body passes through and is fixed to the through hole portion.

In an embodiment of the invention, the second machine body includes an arc shape containing groove and a stopper surface located in the arc shape containing groove. When the axis body is rotated, a portion of the arc shape outer cover rotatably extends into the arc shape containing groove. A rotating range of the arc shape outer cover is limited by the stopper surface.

In view of the foregoing, in the hinge module of the electronic device provided by the invention, the axle sleeve on the second end portion of the torque member is designed as the lunular shape axle sleeve with the gradual changed thickness. The lunular shape axle sleeve of such shape is used to be rotatably sleeved around the axis body of the moving assembly. As such favorable torque efficiency may be effectively provided when the axis body is rotated relative to the lunular shape axle sleeve.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
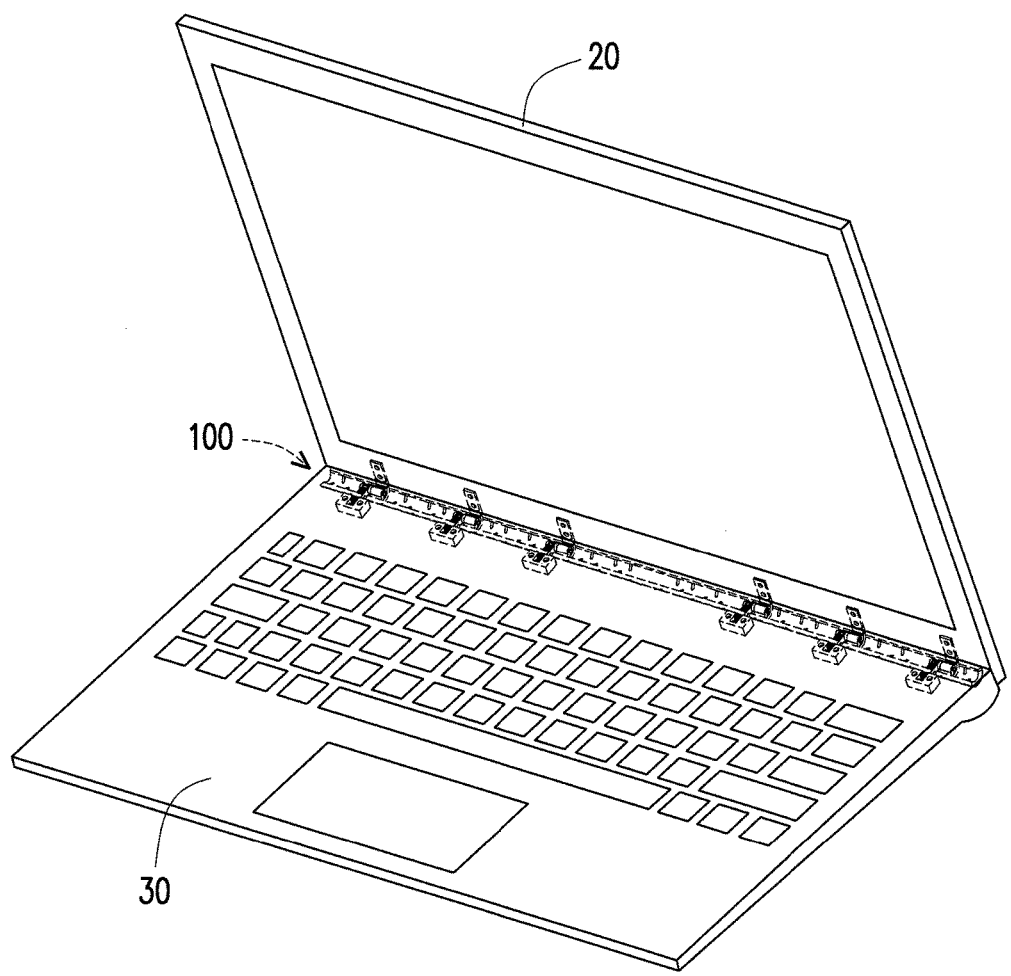
FIG. 1 is a schematic view of an electronic device according to an embodiment of the invention.

FIG. 1 is a schematic view of an electronic device according to an embodiment of the invention. Referring to FIG. 1, an electronic device 10 provided by the embodiment includes a first machine body 20, a second machine body 30, and at least one hinge module 100 located between the first machine body 20 and the second machine body 30. The first machine body 20 is pivoted to the second machine body 30 through the at least one hinge module 100. In FIG. 1, the number of the at least one hinge module 100 is exemplified as six, and the hinge modules 100 are distributed symmetrically on the right side and left side between the first machine body 20 and the second machine body 30. Certainly, the number and the positions of the hinge modules 100 are not limited thereto. The number and positions of the hinge modules 100 may be adjusted by a designer himself/herself as required.

In addition, the electronic device 10 provided by the embodiment is exemplified as a notebook computer. The first machine body 20 is a machine body with a display screen. The second machine body 30 is a machine body with a keyboard. Nevertheless, types of the electronic device 10, the first machine body 20, and the second machine body 30 are not limited thereto. The electronic device 10 only has to be a device with two machine bodies that are able to pivot relative to each other. The hinge modules 100 provided by the embodiment may provide favorable torque efficiency, and detailed description is as follows.

Figure 2:
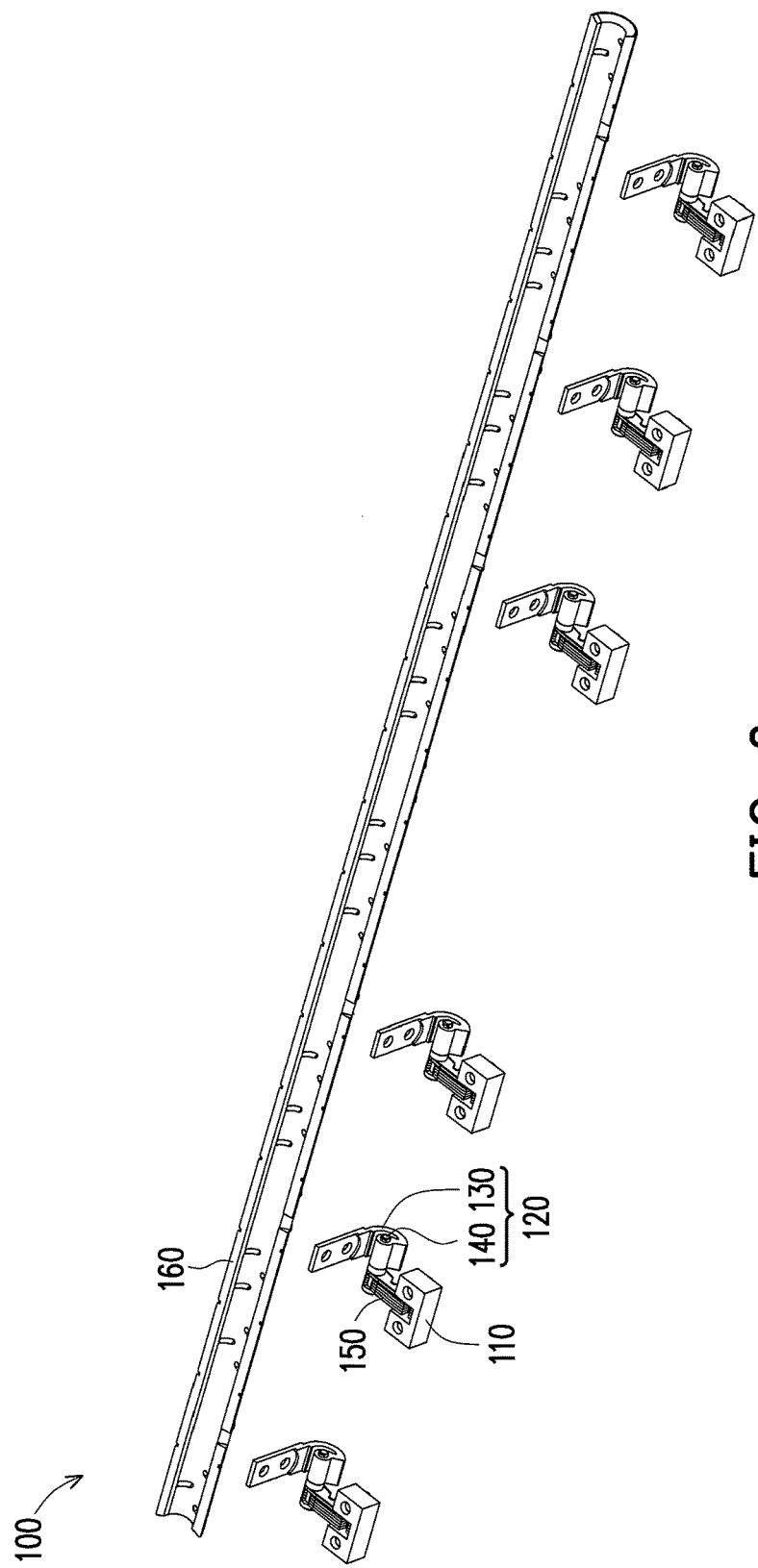
FIG. 2 is a schematic view of hinge modules of the electronic device in FIG. 1.
Figure 3:
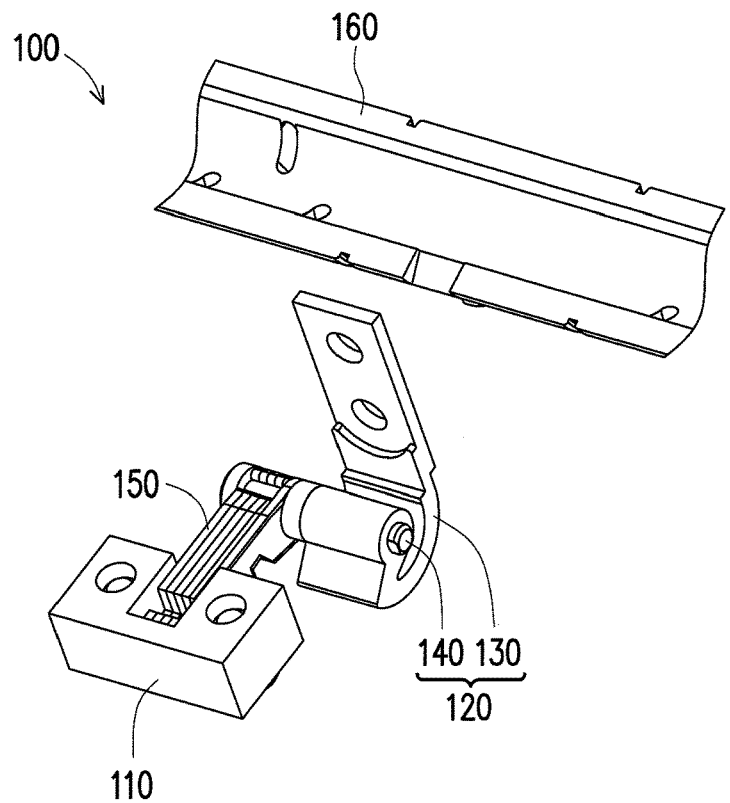
FIG. 3 is a schematic enlarged view of a portion of the hinge module in FIG. 2.
Figure 4:
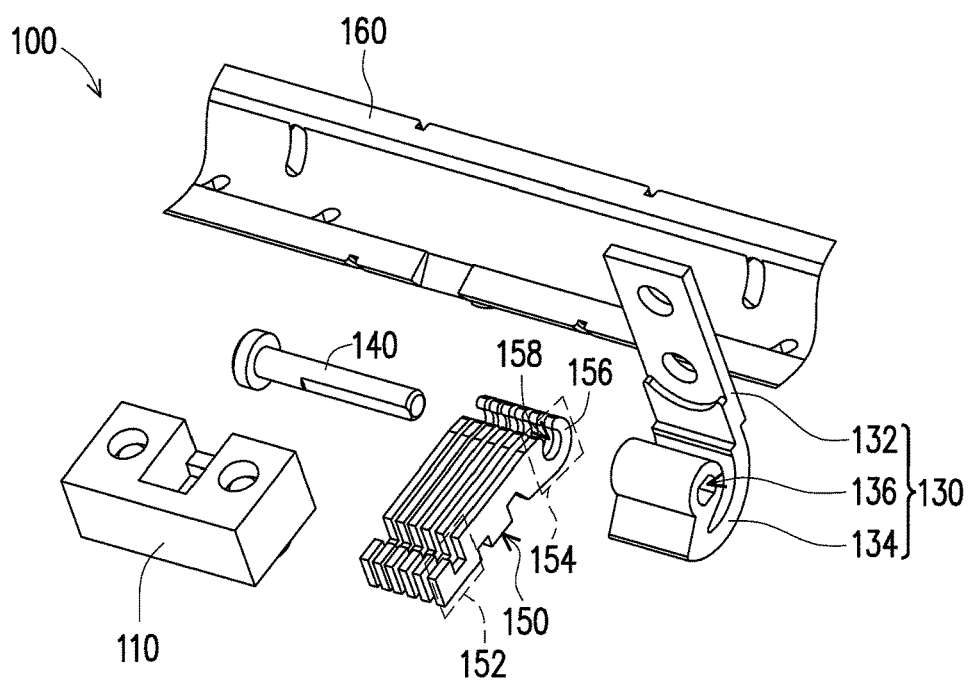
FIG. 4 is a schematic exploded view of the hinge module in FIG. 2.

FIG. 2 is a schematic view of hinge modules of the electronic device in FIG. 1. FIG. 3 is a schematic enlarged view of a portion of the hinge module in FIG. 2. FIG. 4 is a schematic exploded view of the hinge module in FIG. 2. Referring to FIG. 1 to FIG. 4, the hinge module 100 provided by the embodiment includes a fixing member 110, a moving assembly 120, and at least on torque member 150. The fixing member 110 is fixed to the second machine body 30. The moving assembly 120 includes a bracket 130 and an axis body 140 protruding from the bracket 130. As shown in FIG. 4, the bracket 130 includes a flat portion 132, an arc shape portion 134 extending from the flat portion 132, and a through hole portion 136 located at an inner side of the arc shape portion 134. The plat portion 132 is fixed to the first machine body 20. The hinge module 100 further includes an arc shape outer cover 160, and the arc shape portion 134 of the bracket 130 is fixed to an inner side of the arc shape outer cover 160. In other words, the relative position of the arc shape outer cover 160 and the first machine body 20 is fixed. The axis body 140 passes through and is fixed to the through hole portion 136.

Each of the at least one torque member 150 includes a first end portion 152 and a second end portion 154 opposite to each other. The first end portion 152 is fixed to the fixing member 110. The second end portion 154 includes a lunular shape axle sleeve 156 with an opening 158. The lunular shape axle sleeve 156 is rotatably sleeved around the axis body 140 for providing friction so as to form torques while the axis body 140 is rotated relative to the lunular shape axle sleeve 156.

In the embodiment, during a process of the first machine body 20 is flipped open relative to the second machine body 30, as the lunular shape axle sleeve 156 is designed to have the opening 158, the lunular shape axle sleeve 156 may slightly be deformed in opening direction along with the rotation of the axis body 140. In other words, the opening 158 of the lunular shape axle sleeve 156 may expand slightly, so as to slightly lower friction generated when the axis body 140 is rotated relative to the lunular shape axle sleeve 156. As such, a user may flip open the first machine body 20 by applying relatively less force. Thereby, probability of the second machine body 30 is also lifted during the process when the first machine body 20 is rotated may be effectively reduced.

By contrast, during a process of the first machine body 20 covering the second machine body 30, along with the rotation of the axis body 140, the lunular shape axle sleeve 156 may slightly be deformed in closing direction. In other words, the opening 158 of the lunular shape axle sleeve 156 may shrink slightly, so as to slightly increase friction generated when the axis body 140 is rotated relative to the lunular shape axle sleeve 156. As such, the user has to apply stronger force to press down the first machine body 20 to lower probability of the first machine body 20 covers the second machine body 30 owing to gravity of the first machine body 20 itself when not being pressed.

As shown in FIG. 4, in the embodiment, the number of the torque member 150 is exemplified as six, but the number of the torque member 150 is not limited thereto. The number of the torque member 150 may be adjusted correspondingly to a torque value required by a designer.

Figure 5:
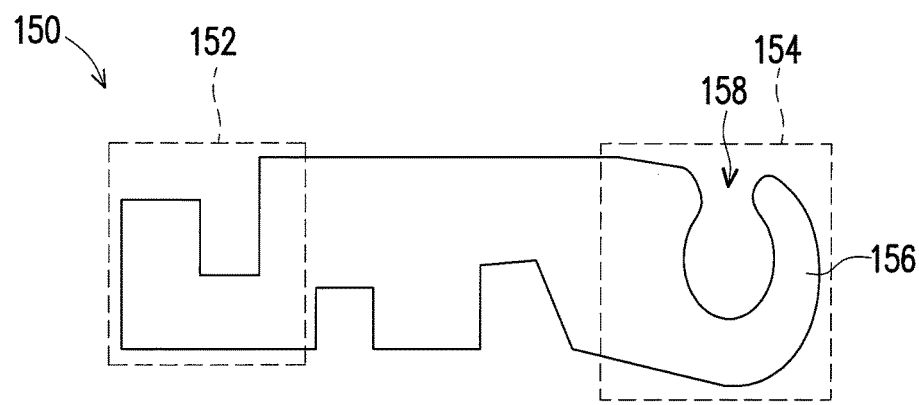
FIG. 5 is a schematic view of a torque member of the hinge module in FIG. 2.
Figure 6:
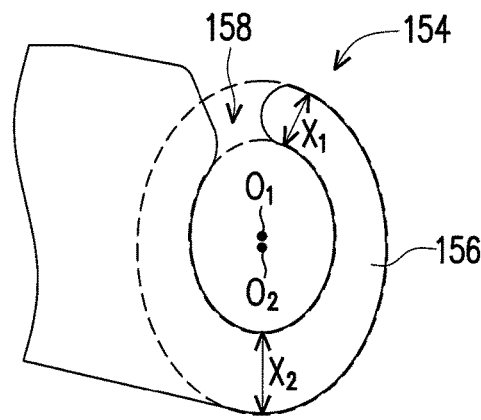
FIG. 6 is a schematic enlarged view of a portion of the torque member in FIG. 5.

FIG. 5 is a schematic view of a torque member of the hinge module in FIG. 2. FIG. 6 is a schematic enlarged view of a portion of the torque member in FIG. 5. Referring to FIG. 5 and FIG. 6, in the embodiment, the lunular shape axle sleeve 156 has a gradual changed thickness. Specifically, as shown in FIG. 6, a thickness T1 of a portion of the lunular shape axle sleeve 156 away from the opening 158 is greater than a thickness T2 of a portion of the lunular shape axle sleeve 156 away from the first end portion 152 and close to the opening 158. A thickness of the lunular shape axle sleeve 156 gradually increases from the portion away from the first end portion 152 and close to the opening 158 (i.e., the portion marked with T2) to the portion away from the opening 158 (i.e., the portion marked with T1). In the lunular shape axle sleeve 156 provided by the embodiment, as the thickness of the portion away from the opening 158 is increased, such that rigidity of the structure is strengthened and torque is further enhanced.

In the embodiment, a value of a ratio of the thickness T1 of the portion of the lunular shape axle sleeve 156 away from the opening 158 to the thickness T2 of the portion of the lunular shape axle sleeve 156 away from the first end portion 152 and close to the opening 158 (T1/T2) falls in a range between 1.2 and 3. According to simulation, rigidity of the lunular shape axle sleeve 156 may deliver favorable performance when the above range of thickness ratio is satisfied.

Furthermore, compared to the lunular shape axle sleeve with no thickness changes, when the value of the ratio of the thickness T1 of the portion of the lunular shape axle sleeve 156 provided by the embodiment away from the opening 158 to the thickness T2 of the portion of the lunular shape axle sleeve 156 away from the first end portion 152 and close to the opening 158 (T1/T2) is 1.2, the highest torque value may be increased from 0.3 kg*cm to 0.5 kg*cm, and the lowest torque value may be increased from 0.2 kg*cm to 0.4 kg*cm. It is thus can be seen that the lunular shape axle sleeve 156 with the gradual changed thickness may have greater torque efficiency.

Alternatively, as shown in FIG. 6, in the embodiment, a position of a central point O1 surrounded and defined by an inner surface of the lunular shape axle sleeve 156 is different from a position of a central point O2 surrounded and defined by an outer surface of the lunular shape axle sleeve 156. In other words, the lunular shape axle sleeve 156 is an eccentric structure in which the outer surface and the inner surface share different central points. In the embodiment, a distance between the central point O1 surrounded and defined by the inner surface of the lunular shape axle sleeve 156 and the central point O2 surrounded and defined by the outer surface of the lunular shape axle sleeve 156 (i.e., eccentric displacement) is half the value of the thickness T1 of the portion of the lunular shape axle sleeve 156 away from the opening 158 minus the thickness T2 of the portion of the lunular shape axle sleeve 156 away from the first end portion 152 and close to the opening 158, i.e., (T1−T2)/2. Certainly, in other embodiments, distance relation between the central point O1 surrounded and defined by the inner surface of the lunular shape axle sleeve 156 and the central point O2 surrounded and defined by the outer surface of the lunular shape axle sleeve 156 is not limited thereto.

Figure 7:
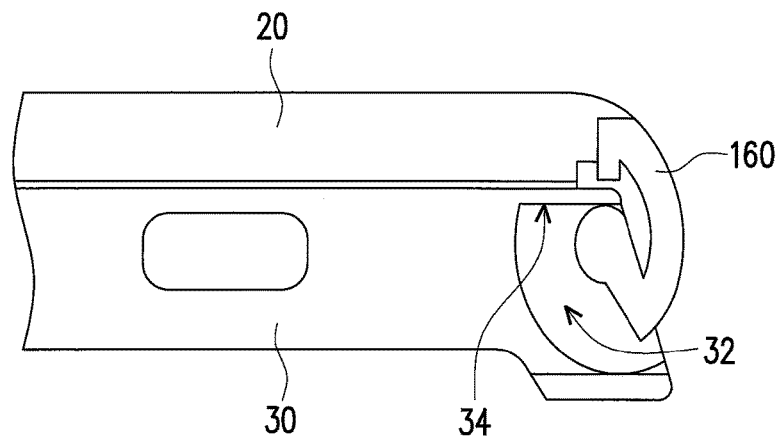
FIG. 7 is a schematic cross-sectional view of a portion of the first machine body covers the second machine body of the electronic device in FIG. 1.
Figure 8:
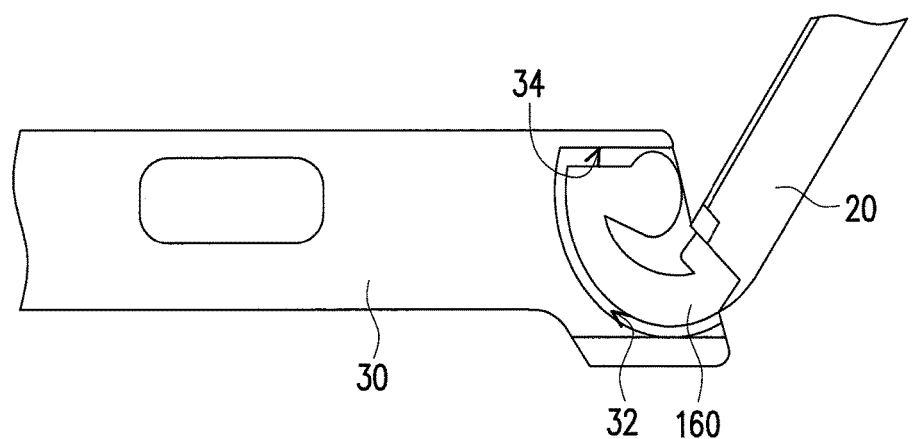
FIG. 8 is a schematic cross-sectional view of a portion of the first machine body is flipped relative to the second machine body of the electronic device in FIG. 1.

FIG. 7 is a schematic cross-sectional view of a portion of the first machine body covers the second machine body of the electronic device in FIG. 1. FIG. 8 is a schematic cross-sectional view of a portion of the first machine body is flipped relative to the second machine body of the electronic device in FIG. 1. Referring to FIG. 7 and FIG. 8, in the embodiment, a portion of the second machine body 30 close to the hinge module 100 includes an arc shape containing groove 32 and a stopper surface 34 located inside the arc shape containing groove 32. In the embodiment, the stopper surface 34 is the bottom surface of the arc shape containing groove 32. A portion of the arc shape outer cover 160 is located inside the arch shape containing groove 32. When the axis body 140 is rotated, a portion of the arc shape outer cover 160 and a portion of the bracket 130 (shown in FIG. 2) located therein rotatably extend into the arc shape containing groove 32 together until being in contact with the stopper surface 34. In other words, the maximum angle at which the first machine body 20 is rotated relative to the second machine body 30 is a range of rotation of the arc shape outer cover 160 in the arc shape containing groove 32.

Figure 9:
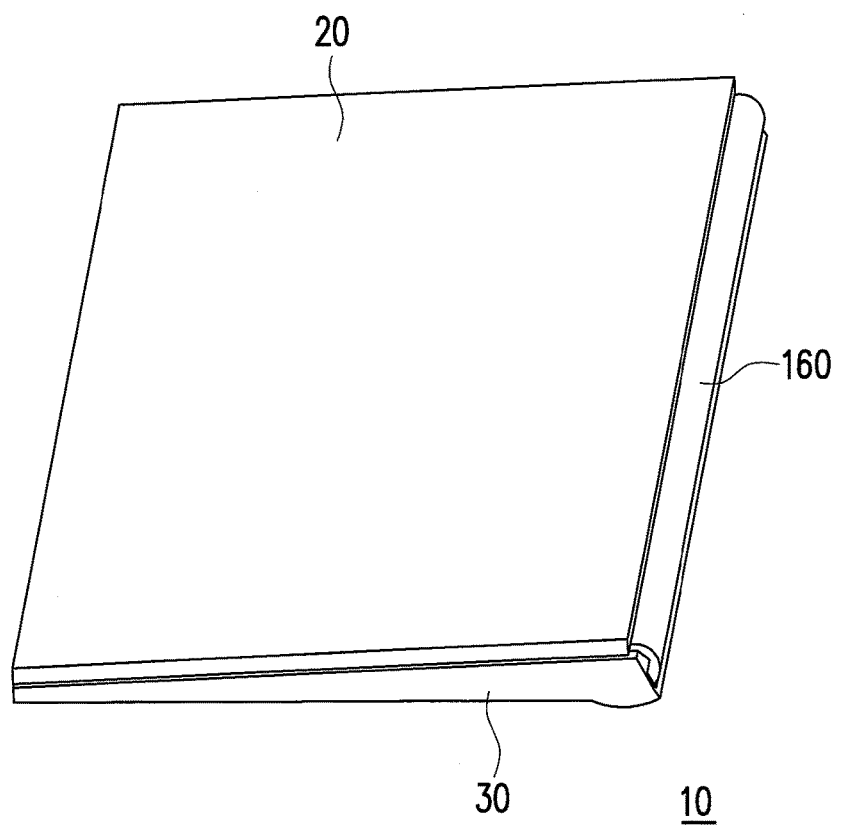
FIG. 9 is a schematic view of the first machine body covers the second machine body of the electronic device in FIG. 1.
Figure 10:
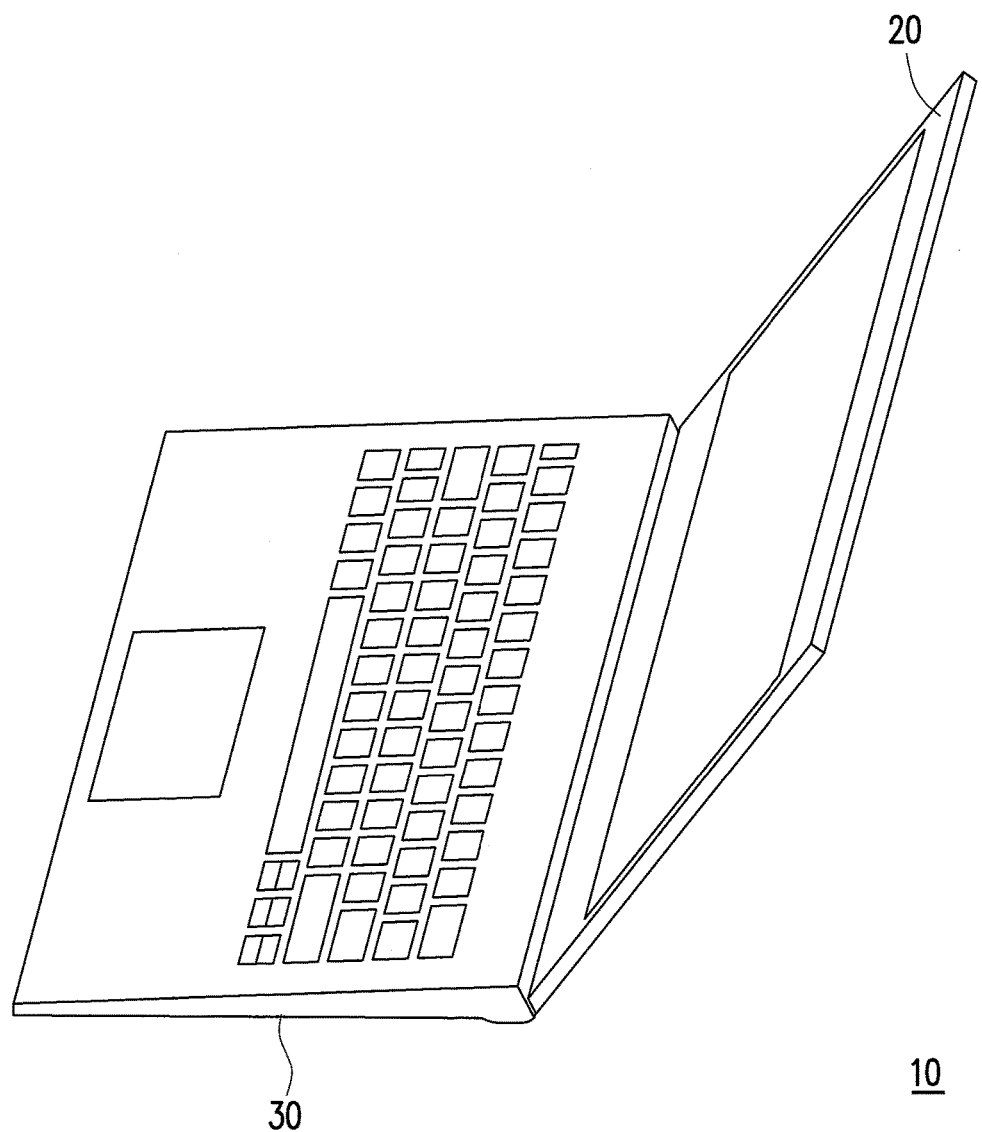
FIG. 10 is a schematic view of the first machine body is flipped relative to the second machine body of the electronic device in FIG. 1.

FIG. 9 is a schematic view of the first machine body covers the second machine body of the electronic device in FIG. 1. FIG. 10 is a schematic view of the first machine body is flipped relative to the second machine body of the electronic device in FIG. 1. Specifically, FIG. 9 is a schematic view illustrating an appearance of an outer side of the electronic device 10 when the first machine body 20 covers the second machine body 30. FIG. 10 is a schematic view illustrating the appearance of an inner side of the electronic device 10 when the first machine body 20 is flipped relative to the second machine body 30. Referring to FIG. 9, when the first machine body 20 covers the second machine body 30, the hinge modules 100 are covered by the arc shape outer cover 160. Referring to FIG. 8 and FIG. 10, when the first machine body 20 is flipped relative to the second machine body 30, a portion of the arc shape outer cover 160 of the hinge module 100 extends into the second machine body 30 and is thus is hidden. Looking from the inner side of the electronic device 10 (FIG. 10), the first machine body 20 is considerably close to the second machine body 30, and most of the hinge modules 100 are hidden inside the second machine body 30. The outer appearance of the electronic device 100 thus looks simple and beautiful.

To sum up, in the hinge module of the electronic device provided by the embodiments of the invention, the axle sleeve on the second end portion of the torque member is designed as the lunular shape axle sleeve with the gradual changed thickness. The lunular shape axle sleeve of such shape is used to be rotatably sleeved around the axis body of the moving assembly. As such, favorable torque efficiency may be effectively provided when the axis body is rotated relative to the lunular shape axle sleeve. In addition, when the first machine body covers the second machine body, the hinge modules are covered by the arc shape outer cover. When the first machine body is flipped, the arc shape outer cover along with the portion of the bracket located therein rotatably extend into the arc shape containing groove of the second machine body, such that most of the hinge modules are hidden inside the second machine body. The outer appearance of the electronic device thus looks simple and beautiful.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hinge module, comprising:
    a fixing member,
    a moving assembly, comprising a bracket and an axis body protruding from the bracket; and
    a torque member, comprising a first end portion and a second end portion opposite to each other, wherein the first end portion is fixed to the fixing member, the second end portion comprises a lunular shape axle sleeve with an opening, the lunular shape axle sleeve is rotatably sleeved around the axis body for providing friction so as to form torques while the axis body is rotated relative to the lunular shape axle sleeve, and the lunular shape axle sleeve has a gradual changed thickness,
    wherein a position of a central point surrounded and defined by an inner surface of the lunular shape axle sleeve is different from a position of a central point surrounded and defined by an outer surface of the lunular shape axle sleeve.

2. The hinge module as claimed in claim 1, wherein a thickness T1 of a portion of the lunular shape axle sleeve away from the opening is greater than a thickness T2 of a portion of the lunular shape axle sleeve away from the first end portion and close to the opening.

3. The hinge module as claimed in claim 1, wherein a value of a ratio of a thickness T1 of a portion of the lunular shape axle sleeve away from the opening to a thickness T2 of a portion of the lunular shape axle sleeve away from the first end portion and close to the opening (T1/T2) falls in a range between 1.2 and 3.

4. An electronic device, comprising,
a first machine body;
a second machine body; and
a hinge module, comprising
a fixing member, fixed to the second machine body;
a moving assembly, comprising a bracket and an axis body protruding from the bracket, wherein the bracket is fixed to the first machine body; and
a torque member, comprising a first end portion and a second end portion opposite to each other, wherein the first end portion is fixed to the fixing member, the second end portion comprises a lunular shape axle sleeve with an opening, the lunular shape axle sleeve is rotatably sleeved around the axis body for providing friction so as to form torques while the axis body is rotated relative to the lunular shape axle sleeve, and the lunular shape axle sleeve has a gradual changed thickness,
wherein a position of a central point surrounded and defined by an inner surface of the lunular shape axle sleeve is different from a position of a central point surrounded and defined by an outer surface of the lunular shape axle sleeve.

5. The electronic device as claimed in claim 4, wherein a thickness T1 of a portion of the lunular shape axle sleeve away from the opening is greater than a thickness T2 of a portion of the lunular shape axle sleeve away from the first end portion and close to the opening.

6. The electronic device as claimed in claim 4, wherein a value of a ratio of the thickness T1 of a portion of the lunular shape axle sleeve away from the opening to a thickness T2 of the portion of the lunular shape axle sleeve away from the first end portion and close to the opening (T1/T2) falls in a range between 1.2 and 3.

7. The electronic device as claimed in claim 4, wherein the bracket comprises a flat portion, an arc shape portion extending from the flat portion, and a through hole portion located at an inner side of the arc shape portion, the flat portion is fixed to the first machine body, the hinge module further comprises an arc shape outer cover, the arc shape portion of the bracket is fixed to an inner side of the arc shape outer cover, and the axis body passes through and is fixed to the through hole portion.

8. The electronic device as claimed in claim 7, wherein the second machine body comprises an arc shape containing groove and a stopper surface located in the arc shape containing groove, a portion of the arc shape outer cover rotatably extends into the arc shape containing groove when the axis body is rotated, and a rotating range of the arc shape outer cover is limited by the stopper surface.

* * * * *